United States Patent [19]
Anderson

[11] Patent Number: 4,673,346
[45] Date of Patent: Jun. 16, 1987

[54] CAULKING FORMING TOOL

[76] Inventor: John Anderson, 1018 Leisure Ave., Tampa, Fla. 33613

[21] Appl. No.: 793,741

[22] Filed: Oct. 31, 1985

[51] Int. Cl.[4] .................... B29C 59/00

[52] U.S. Cl. .................... 425/458; 15/235.3; 81/8.1

[58] Field of Search .................. 30/161, 155; 425/458, 425/318; 15/235.3; 81/8.1

[56] References Cited

U.S. PATENT DOCUMENTS

| | | | |
|---|---|---|---|
| 292,473 | 1/1884 | Dietrich et al. | 30/161 |
| 449,499 | 3/1891 | Schmachtenberg | 30/155 |
| 692,092 | 1/1902 | Upham | 30/155 |
| 708,806 | 9/1902 | Garda | 30/161 |
| 736,741 | 8/1903 | Klemm | 30/161 |
| 1,292,558 | 1/1919 | Akerson | 15/235.3 |
| 1,530,348 | 3/1925 | Blom | 30/155 |
| 1,556,788 | 10/1925 | Hallvarson | 30/155 |
| 1,875,754 | 9/1932 | Walker | 30/155 |
| 2,247,604 | 12/1938 | Christman | 425/458 |
| 2,359,408 | 10/1944 | Disse | 30/169 |
| 2,498,171 | 2/1950 | Michler | 33/168 |
| 2,528,911 | 11/1950 | Fortner | 425/183 |
| 2,715,750 | 10/1951 | Vail | 49/492 |
| 2,759,218 | 8/1956 | Smith | 172/307 |
| 2,824,368 | 2/1958 | Bassett | 30/161 |
| 3,816,923 | 6/1974 | Habermeier | 33/1 BB |

FOREIGN PATENT DOCUMENTS

| | | | |
|---|---|---|---|
| 0100377 | 2/1984 | European Pat. Off. | 30/161 |
| 912386 | 4/1946 | France | 30/161 |
| 1043285 | 11/1953 | France | 30/161 |
| 246742 | 2/1926 | United Kingdom | 30/161 |

*Primary Examiner*—Willard E. Hoag
*Attorney, Agent, or Firm*—Stein & Reese

[57] ABSTRACT

A caulking forming tool having a generally U-shaped handle member and a plurality of blades designed to tool applied caulking to a uniform thickness and smoothness, free of air pockets.

6 Claims, 3 Drawing Figures

CAULKING FORMING TOOL

BACKGROUND OF THE INVENTION

1. Field of the Invention

This invention relates to tools in general and, more particularly, to caulking forming tools designed to tool applied caulking to a uniform thickness and smoothness, free of air pockets.

2. Description of the Background Art

Presently, caulking is used throughout the construction industry to seal expansion and contraction joints always prevalent throughout the structure under construction. Caulking not only provides a seal to weatherproof the joint, but also prevents insects and the like from entering the structure. Also, when properly tooled, caulking provides an esthetically pleasing appearance to the building.

Typical sealing joints may range from one-quarter inch to over six inches in width, with the optimum distance being generally around one-half inch. Because of the surprising amount of movement in many of the caulked joints, the caulking must be resilient and, hence, capable of stretching or contracting.

Two of the more critical concerns in properly sealing a joint with caulking are providing a continuous bonding of the caulking with both sides of the joint and maintaining a predetermined and uniform caulking depth. The first concern is obvious inasmuch as a properly sealed joint is always desirable. The second concern of maintaining a predetermined and uniform caulking depth may not be as obvious but is just as important as excessively deep caulking will have less resiliency and, hence, may exceed the bond strength between the caulking and the joint wall. Indeed, generally accepted principles concerning caulking depth typically require that the depth of the caulking not exceed five-eighths of an inch or one-half of the caulking's width, whichever is less. Two procedures are used to insure proper caulking depth. First, prior to caulking the joint, a foam "backer rod" is compressed and inserted into the joint along its entire length. The backer rod is compressed into the joint to a uniform depth consistent with the caulking widthdepth ratio discussed above. After positioning the backer rod, uncured caulking is "shot" into the joint with a caulking gun or the like. It is noted that the backer rod not only insures a uniform and proper depth of the joint but also provides, under certain circumstances, necessary support for the caulking until it cures.

The second procedure is referred to as "tooling the caulking". After shooting the caulking into the joint, the exposed surface is lumpy and irregular. The tooling results in a number of necessary improvements. It forces the caulking to completely fill the joint by pushing it against the backer rod on the bottom and against the sides thereby insuring bonding to both sides while removing any air pockets. As the caulking is tooled flush with the top edges of the joint, the critical uniform depth of the caulking is attained. Furthermore, the tooling produces an esthetically pleasing finish.

While many specialized tools exist for the mixing, handling and shooting of the caulking, virtually no specialized tools exist on the market for the tooling procedure. Furthermore, none of the devices disclosed in the patents located during the patentability search (as identified in the Information Disclosure Statement filed herewith) were materially relevant to this invention.

Indeed, the only type of caulking tools commonly in use are "pointing irons" which were originally designed for use in masonry work. These pointing irons typically comprise an individual blade of a certain width, having a handle attached thereto. Obviously, a particular pointing iron is useful for caulking only one joint of a particular width. Consequently, the tradesman tooling the caulking must necessarily have a large number of pointing irons in order to properly caulk joints of various widths. The requirement of having on hand a large number of pointing irons increases the likelihood of inadvertently losing one, thereby requiring the tradesman to replace it. Each pointing iron may range in price from six dollars to nine dollars or more. This is assuming, of course, that all the pointing irons having blades of a desired width can be purchased. Those which cannot be purchased require that the tradesman reduce the width of an oversized blade by grinding or other technique.

Finally, instead of purchasing a large number of pointing irons, some tradesmen resort to using common kitchen flatware such as knives and spoons. Of course, since knives and spoons have only a predetermined width, the tradesman must individually grind or otherwise reduce the width of the knife or spoon and flatten the tips of them. Moreover, even if the tradesman does alter a large number of knives or spoons to the different required widths needed by him during the caulking process, it is quite apparent each knife or spoon looks substantial like another precluding the tradesman from quickly distinguishing the implement having the desired configuration. Instead, the tradesman must sort through the collection of knives and spoons until he finds one of an appropriate width. Still further, it is unreasonable to expect that caulking tools obtained by reforming household flatware will have the durability to last in a commercial construction setting.

Therefore, it is an object of this invention to provide a method which overcomes the aforementioned inadequacies of the prior art methods and provides an improvement which is a significant contribution to the advancement of the caulking forming tool art.

Another object of this invention is to provide a caulking forming tool including a collection of different widths of caulking blades.

Another object of this invention is to provide a caulking forming tool including a collection of various widths of blades fastened together thereby preventing inadvertent loss or separation of the blades.

Another object of this invention is to provide a caulking forming tool including a collection of various width blades with means for securing the blades in order based upon the width of the blades.

Another object of this invention is to provide a caulking forming tool which is compact, light-weight, sturdy and inexpensive including a collection of different width blades.

The foregoing has outlined some of the more pertinent objects of the invention. These objects should be construed to be merely illustrative of some of the more prominent features and applications of the intended invention. Many other beneficial results can be attained by applying the disclosed invention in a different manner or modifying the invention within the scope of the disclosure contained herein and in the above identified patents, the disclosure of which is hereby incorporated by reference herein. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The invention is defined by the appended claims with a specific embodiment shown in the attached drawings. For the purpose of summarizing the invention, the invention comprises a caulking forming tool designed to tool caulking recently shot into a joint. More particularly, the caulking forming tool of the invention comprises a generally U-shaped handle member including upstanding side walls and a bottom wall disposed in a U-shaped configuration. A plurality of caulking blades are pivotably secured within the U-shaped portion of the handle. Each blade is designed to pivot from its retracted position within the handle to an extended position substantially colinear with handle. Further, each blade is composed of a relatively thin material, such as spring steel, and includes a progressively more narrow width. Preferably, the blades are pivotably connected within the handle in an orderly manner based upon their width such that the greatest width blade is positioned adjacent to the blade with the next greatest width and so on. The orderly positioning of the blades based upon their width within the handle allows the tradesman to quickly, easily and accurately sort through the blades to select the blade of the desired width.

The caulking forming tool of the invention still further comprises a locking means for locking the individual selected blade in the extended position while in use and to further lock the remaining blades in the handle in their retracted position. The locking mechanism assures that the blades not in use will remain retracted within the handle while assuring that the blade in use will remain steadily positioned in the handle.

It is readily apparent that the caulking forming tool of the invention overcomes many of the disadvantages associated with pointing irons and other tools constructed from kitchen flatware such as knives and spoons. More specifically, the caulking forming tool of the invention is featured by securing all of the caulking blades needed for a variety of caulking procedures within a comfortable handle. During the caulking procedure, the tradesman simply selects the desired width blade and pivots it from the handle to its extended position colinear with the handle and locks it into position. Moreover, when a different sized blade is required, the tradesman simply returns the extended blade to its retracted position in the handle and selects another blade having the desired width. Additionally, the handle which conveniently stores all of the blades together precludes the inadvertent loss of individual tools as is common with prior art tools.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figures 1, 2, 3:
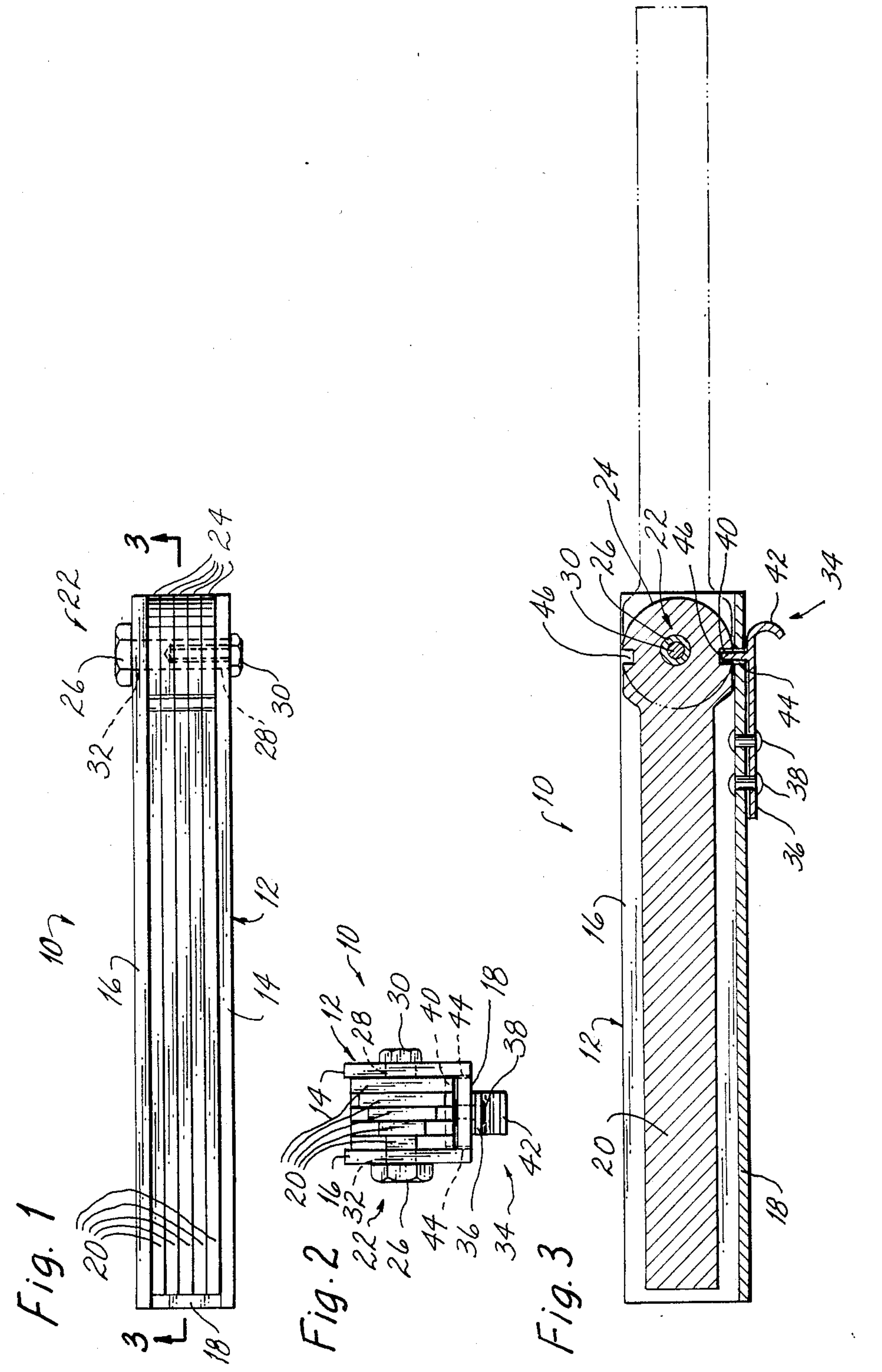
FIG. 1 is a top view of the caulking forming tool of the invention.
FIG. 2 is a left end view of FIG. 1 illustrating the caulking blade having various widths.
FIG. 3 is a cross-sectional view of FIG. 1 along lines 3—3 illustrating the locking mechanism of the invention which secures the blades in their retracted position within the handle and, additionally, secures a selected blade in its extended position as shown in phantom.

Referring to FIGS. 1 and 2, the caulking forming tool 10 of the invention comprises a U-shaped handle member 12 including upstanding side walls 14 and 16 interconnected by bottom wall 18 thereby defining a U-shaped cross-sectional configuration.

A plurality of caulking blades 20 are pivotably positioned within the handle member 12 between sidewalls 14 and 16 at pivot point 22. As illustrated, each of the caulking blades 20 comprise a relatively long and thin configuration, having a certain width. The widths of each caulking blade 20 differ from those of the others such that an assortment of various width blades 20 are provided. Preferably, the caulking blades 20 are pivotably contained within the handle member 12 in order determined by their width such that the greatest width blade is positioned adjacent to the next to the greatest width blade, and so on. The various width blades 20 positioned in such an order allows the tradesman to quickly and easily select the desired width of blade and pivot it to the extended position for use.

Referring now to FIG. 3, in conjunction with FIG. 1, the pivot point 22 operatively connects the blade ends 24 between the side walls 14 and 16 of handle member 12 in such a manner that the blades 20 may easily pivot to and from the retracted position within the handle 12 and the extended position as shown in phantom in FIG. 3. While many embodiments of the pivot point 22 may suffice, the preferred pivot point 22 comprises a threaded boss 26 positioned through aperture 28 in side wall 14 and aperature 32 in side wall 16. The threaded boss 26 includes a length sufficient to extend fully across the distance between side walls 14 and 16 and through the other side wall 16. A threaded fastener 30, such as a bolt, extends through aperture 32 in the other side wall 16 to threadably engage the threads of threaded boss 26. It is noted that this particular configuration of pivot point 22, allows bolt 30 to be rigidly threaded into threaded boss 26 and torqued to a high degree to assure that the bolt 30 and boss 26 will not loosen during use of the tool 10. Indeed, it is noted that torquing the bolt 30 into boss 26 does not affect the distance between side walls 14 and 16 as determined by the length of threaded boss 26 thereby preventing any binding of the caulking blades 20 during pivoting.

The caulking forming tool 10 may additionally include a locking mechanism, generally indicated by numeral 34. The locking mechanism 34 is designed to releasably secure the blades 20 in either their retracted position within handle member 12 or in their extended position as shown in phantom in FIG. 3. The preferred embodiment of the locking mechanism 34 comprises an elongated spring member 36 preferably composed of spring steel or the like. The spring member 26 is connected to the bottom wall 18 by means of rivets 38 or other fasteners. Spring member 36 further includes protuberance 40 and outwardly extending tab 42. Protuberance 40 is positioned to extend through aperture 44 in bottom wall 18 to engage into corresponding indentations 46 in opposing edges of each of the caulking blades 20. In this regard, it is noted that the ends 24 of the blades 20 are of a uniform width, with each containing respective indentations 46. The uniform width end 24 of the blades 20 allows the protuberance 40 of spring member 36 to releasably engage into the indentations 46 to releasably secure the caulking blades 20 in either their retracted position or their extended position. Moreover, any caulking blade 20 may be selected and individually moved from one position to the other by simply grasping and pulling tab 42 away from bottom wall 18 whereupon the protuberance 40 disengages indentation 46 allowing the selected blade to freely pivot. When the blade 20 had been repositioned to either its retracted or extended position, protuberance 40 snaps into indentation 46 thereby securing the blade 20 in such a position.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit of the invention.

Now that the invention has been described,

What is claimed is:

1. A caulking forming tool, comprising in combination:

a generally U-shaped handle member having an elongated length and composed of thin material, said handle member including elongated upstanding side walls of a certain width interconnected by an elongated bottom wall;

a plurality of uniformly thin planar elongated caulking blades of uniform design, each said caulking blade having an elongated length substantially equal to said length of said U-shaped handle member, one said caulking blade having a width substantially equal to the width of said side walls and the other said caulking blades each having a width progressively narrower than the first caulking blade; and means for pivotably connecting said caulking blades within said handle member with said width of said caulking blades being parallel with said width of said side walls of said handle member whereby said caulking blades may be individually selected and pivoted from said retracted position within the handle member to an extended position for use.

2. The caulking forming tool as set forth in claim 1, wherein said caulking blades are pivotably secured within said handle member in order based upon the width of said blades.

3. The caulking forming tool as set forth in claim 1, further comprising means for locking said caulking blades in said retracted position within said handle member or in said extended position.

4. The caulking forming tool as set forth in claim 3, wherein said locking means comprises a protuberance which engages into indentations positioned in an end of said blades to secure said blades in said retracted position or said extended position.

5. The caulking forming tool as set forth in claim 4, wherein said protuberance further comprises tab means allowing said protuberance to releasably engage said indentation.

6. The caulking forming tool as set forth in claim 5, wherein said pivot means comprises a threaded boss extending through an aperture in one said side wall, said threaded boss including a length substantially equal to the distance between said side wall plus the thickness of said side walls, and a threaded fastener for engagement through an aperture in other said side wall to threadably engage said threaded boss.

* * * * *